United States Patent
Dürkopp

(10) Patent No.: US 9,381,850 B2
(45) Date of Patent: Jul. 5, 2016

(54) COMPACT ADJUSTER FOR HEADLIGHT

(75) Inventor: Michael Dürkopp, Lippstadt (DE)

(73) Assignee: HELLA KGAA HUECK & CO., Lippstadt (DE)

(*) Notice: Subject to any disclaimer, the term of this patent is extended or adjusted under 35 U.S.C. 154(b) by 159 days.

(21) Appl. No.: 14/354,899

(22) PCT Filed: Oct. 31, 2011

(86) PCT No.: PCT/EP2011/069082
§ 371 (c)(1),
(2), (4) Date: Apr. 28, 2014

(87) PCT Pub. No.: WO2013/064164
PCT Pub. Date: May 10, 2013

(65) Prior Publication Data
US 2015/0158415 A1  Jun. 11, 2015

(51) Int. Cl.
*B60Q 1/06* (2006.01)
*B60Q 1/068* (2006.01)
*F21S 8/10* (2006.01)
F16H 25/20 (2006.01)

(52) U.S. Cl.
CPC ........... *B60Q 1/0683* (2013.01); *F21S 48/1742* (2013.01); *F16H 2025/2028* (2013.01); *F16H 2025/2093* (2013.01)

(58) Field of Classification Search
CPC ........... B60Q 1/68; B60Q 1/683; F21S 48/17; F21S 48/1742; F21S 17/1757; F16H 2025/2028; F16H 2025/2093
See application file for complete search history.

(56) References Cited

U.S. PATENT DOCUMENTS

| | | | | |
|---|---|---|---|---|
| 4,881,152 A | * | 11/1989 | Watanabe | B60Q 1/0683 362/289 |
| 4,893,219 A | * | 1/1990 | Lisak | B60Q 1/0683 362/270 |
| 5,161,877 A | * | 11/1992 | Wright | B60Q 1/0683 362/421 |
| 5,260,857 A | * | 11/1993 | Lukkarinen | F21S 48/1757 362/428 |
| 5,365,415 A | * | 11/1994 | Schmitt | B60Q 1/0686 362/422 |
| 5,697,692 A | * | 12/1997 | Hoffman | B60Q 1/0683 362/460 |
| 6,017,137 A | * | 1/2000 | Suehiro | B60Q 1/0683 362/289 |
| 2005/0145050 A1 | | 7/2005 | Fladhammer | |

FOREIGN PATENT DOCUMENTS

| | | | |
|---|---|---|---|
| DE | 69015331 T2 | 5/1995 | |
| GB | 1307084 | * 2/1973 | ............ F16B 37/04 |
| GB | 2355516 A | 4/2001 | |
| GB | 2412704 A | 10/2005 | |

* cited by examiner

*Primary Examiner* — Peggy Neils
(74) *Attorney, Agent, or Firm* — Husch Blackwell LLP

(57) ABSTRACT

An adjustment device for headlights with an adjustment screw extending in a predetermined direction of adjustment. The adjustment screw engages a thread of a light module of the headlight for pivoting it about a horizontal or vertical axis. The adjustment screw also engages with a drive means arranged coaxially in reference thereof at a rear end of the adjustment screw. A latching sheath and a drive element surrounding the latching sheath are provided as drive means, receiving the rear end of the adjustment screw. The latching sheath comprises fastening digits elastic in the radial direction, which in the assembled position press against the interior of the drive element. The latching sheath and the drive element are coupled to each other via latching means in the axial direction and in a latching fashion.

10 Claims, 4 Drawing Sheets

COMPACT ADJUSTER FOR HEADLIGHT

CROSS REFERENCE

This application is a national phase application of international patent application number PCT/EP2011/069082, filed Oct. 31, 2011, and hereby incorporates this document by reference.

TECHNICAL DESCRIPTION OF THE INVENTION

The invention relates to an adjustment device for headlights with an adjustment screw extending in a predetermined direction of adjustment, which engages a thread of a light module of the headlight for pivoting it about a horizontal or vertical axis, and with a drive means arranged coaxially at the rear end of the adjustment screw.

An adjustment device for headlights is known from DE 102 38 792 A1, in which for the default setting of a light module of the headlight an adjustment screw is provided, supported in the direction of adjustment, which comprises a thread for coupling to the light module of the headlight. The adjustment screw is connected at a rear end to a drive means, which shows a miter gear, with its teeth being able to engage for example an auxiliary tool in order to rotate the adjustment screw about its axis. This way, the light module connected to the front end of the adjustment screw can be pivoted about a horizontal or vertical axis in reference to the default setting of the headlight. In this adjustment device of prior art it is disadvantageous that it particularly requires a relatively large space in an area outside the housing of the headlight.

SUMMARY OF THE INVENTION

The objective of the present invention is therefore to further develop an adjustment device for headlights such that a simple assembly is possible requiring little force, with the space requirements of the adjustment device outside the housing of the headlight being relatively small.

In order to attain this objective, the invention is characterized in the context with the preamble of claim 1 in that a drive element is provided as the drive means, accepting the rear end of the adjustment screw and surrounding the latching sheath, with the latching sheath comprising fastening digits, elastic in the radial direction, which in the assembled position press against the internal area of the drive element, and with the latching sheath and the drive element being coupled to each other in the axial direction in a latching fashion via latching means.

The invention allows a compact design of an adjustment device, particularly in an area outside the housing of the headlight. A latching sheath accepting the adjustment screw is arranged coaxially and inside the drive element, wherein only free end sections of the latching sheath may project axially beyond the drive element. The drive element only needs to show such an axial length that fastening digits of the latching sheath can press against the interior of the drive element, in order to ensure a radially secured fastening of the adjustment screw and/or the latching sheath. An axial securing occurs by latching means, which are preferably arranged at a free end of the latching sheath and/or the drive element. A manual assembly is enabled here with little force required, when the rear end of the adjustment screw is inserted into the latching sheath and then is impressed together therewith up to an end position inside the drive element, in which an axial fixation occurs by way of latching, at least opposite a direction of assembly.

According to a further development of the invention, the latching sheath comprises a number of radially outwardly projecting entraining bars, which cooperate with corresponding recesses of the drive element such that after the entraining bars have axially engaged the recesses the latching sheath is connected to the drive element in a torque-proof fashion. This way, a guided axial motion of the latching sheath in reference to the drive element is enabled from the default position into the assembled position.

According to a further development of the invention the latching sheath comprises an exterior annular groove, with a fastening ring of the drive element, projecting inwardly in the default position, engaging and thus allowing a defined, detachable connection between the latching sheath and the drive element. The assembly formed in this manner can therefore be provided easily for the assembly process. With the complete insertion of the latching sheath into the drive element an assembly position is reached, in which the latching sheath is connected to the drive element in an undetachable fashion.

According to a further development of the invention the adjustment screw comprises a limiting collar, which in the assembly position presses an O-ring axially against the housing wall of the light module so that the sealing requirements are fulfilled.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

Figure 1:
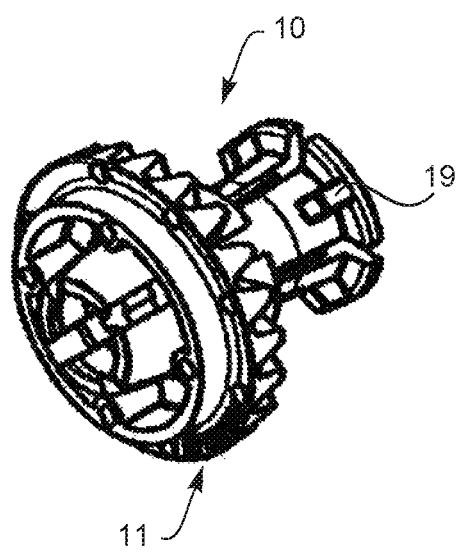
FIG. 1: a perspective illustration of a latching sheath and a drive element of an adjustment device in the default position prior to the start of the assembly.
Figure 2:
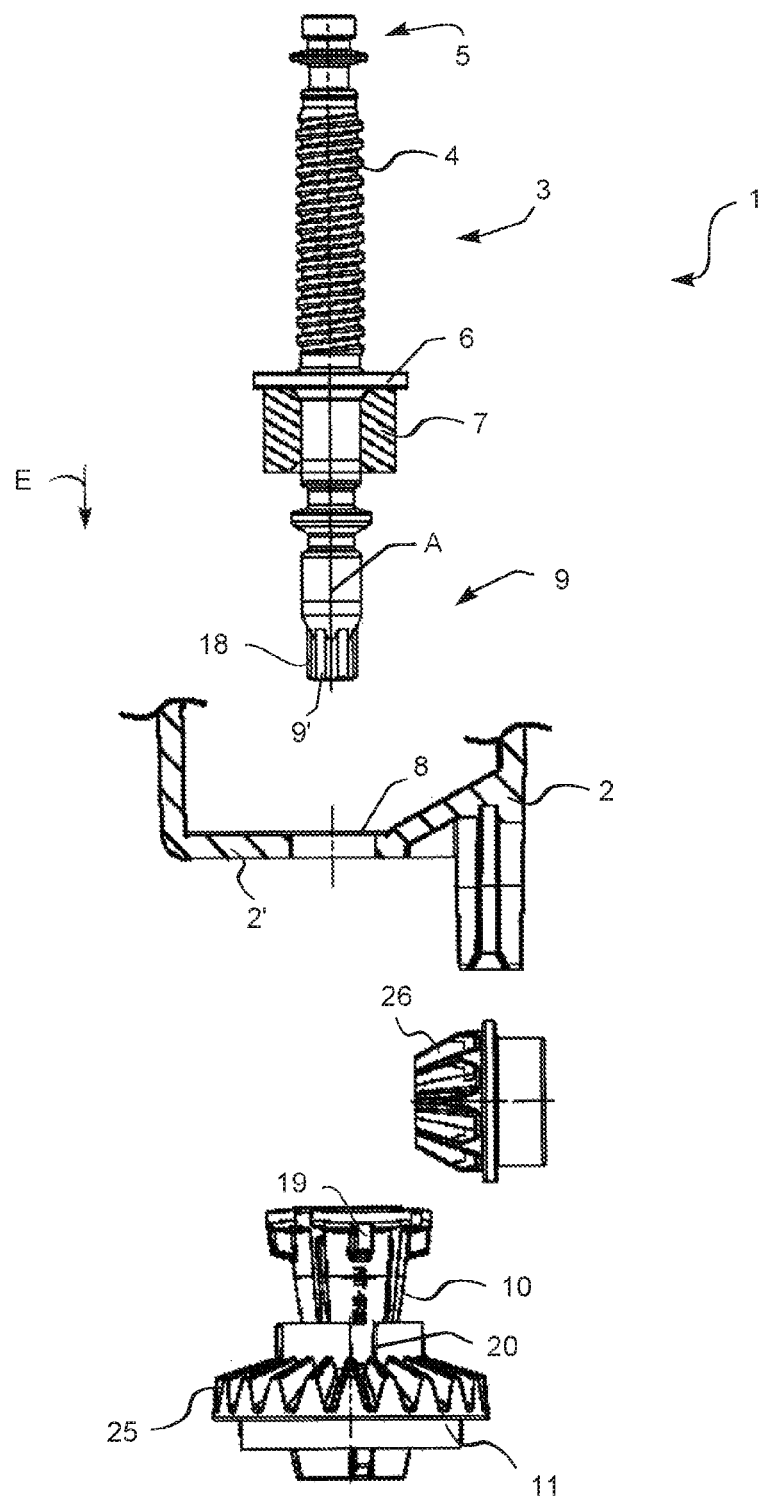
FIG. 2: an exploded illustration of components of the adjustment device.

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

An adjustment device 1 for headlights is used for the mechanical general adjustment of a light module 2 about a horizontal and/or vertical pivotal axis in the headlight. The adjustment device 1 comprises essentially an oblong adjustment screw 3, extending in the direction of adjustment, which via a thread 4 can engage the light module 2 and/or a connector of the light module 2. The light module 2 comprises a housing with a housing wall 2', with for example a light source and a reflector allocated to said light source being arranged inside the housing. The light module 2 is supported pivotally in the housing. The thread 4 extends in an area between the front end 5 of the adjustment screw 3 and a limiting collar 6 thereof. At a side of the limiting collar 6 at the side facing away from the light module 2 an O-ring 7 follows as well as a housing wall 2' of the light module 2 and/or the headlight.

For the assembly, the light module 2, engaging the thread of the adjustment screw 3, is inserted through a bore 8 of the housing wall 2' such that a rear end 9 of the adjustment screw 3 is exposed outside the housing (light module housing) for the assembly of drive means 10, 11 of the adjustment device 1. The adjustment screw 3 is supported with the limiting collar 6 via the O-ring 7 at the housing wall 2'.

Figure 3:
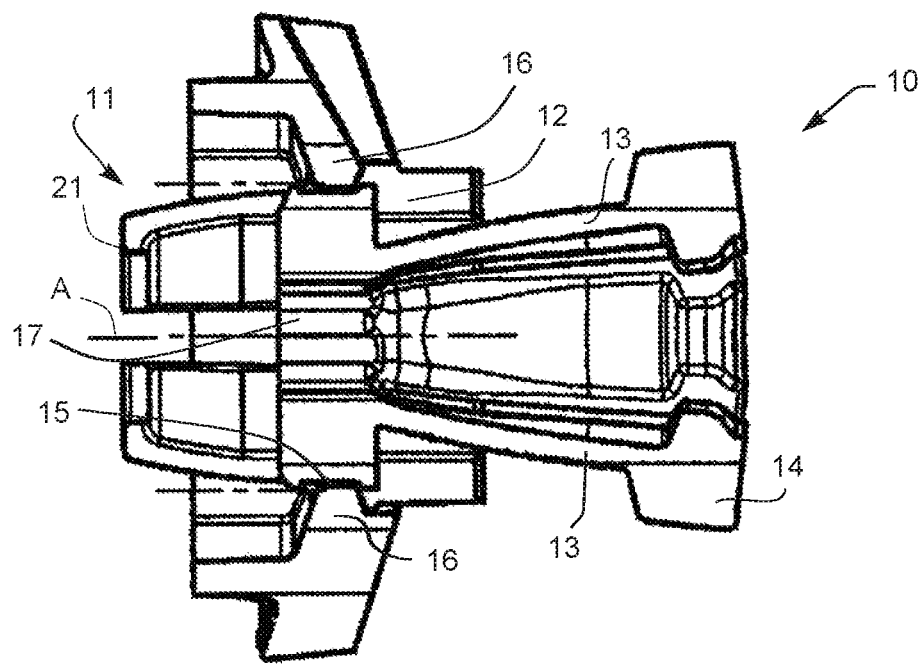
FIG. 3: a longitudinal cross-section through the latching sheath and the drive element in the default position according to FIG. 1, FIG. 4: a longitudinal cross-section through the latching sheath and the drive element in the assembled position.
Figure 4:
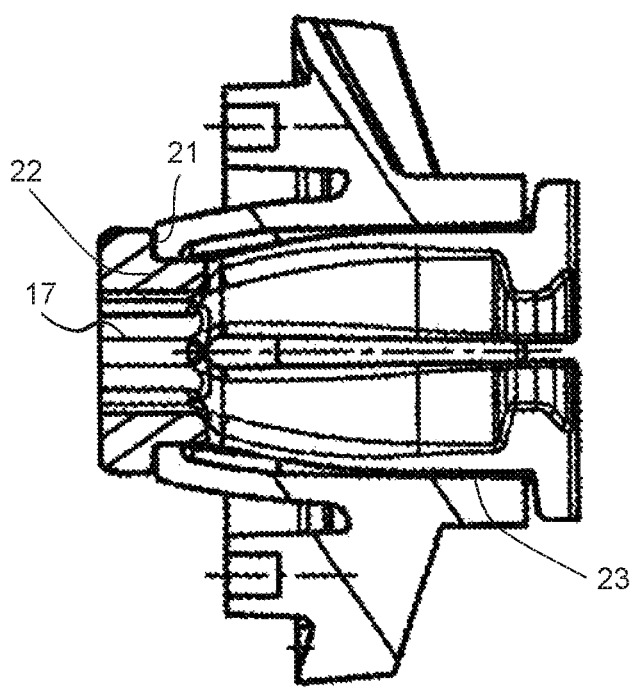
Figure 5:
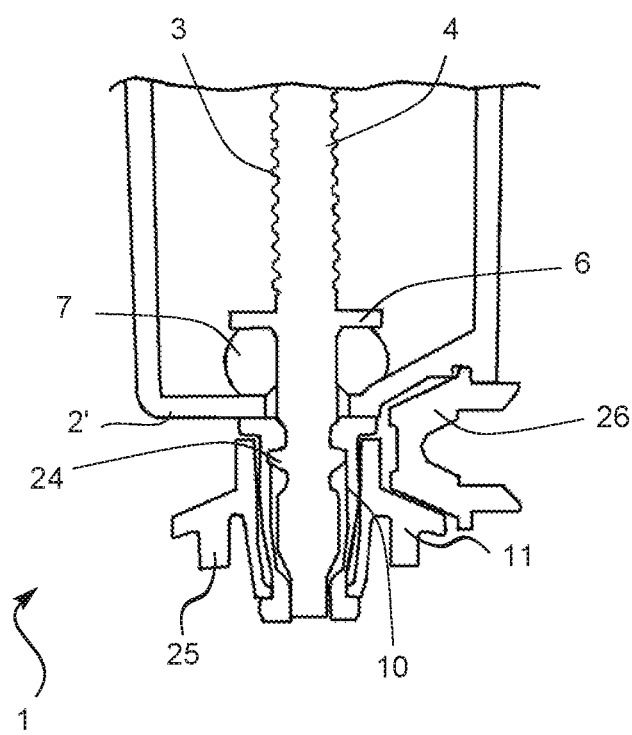
FIG. 5: a longitudinal cross-section through the components of the adjustment device in the assembled position.

A latching sheath 10 is provided as a first drive means and a drive element 11 as a second drive means, which are provided for the assembly in a nested fashion according to FIG. 3. This way, they form a joint assembly, which is placed in the default position upon the rear end 9 of the adjustment screw 3, is displaced axially in reference to the adjustment screw 3 until an assembly position is reached by the axial displacement of the latching sheath 10 in reference to the drive element 11, in which the latching sheath 10 and/or the adjustment screw 3 are secured axially opposite the direction of assembly E at the drive element 11.

The latching sheath 10 essentially comprises an annular latching element 12, with a number of radially elastic fastening digits 13 following opposite the direction of assembly E, i.e. in the direction of the light modules 2. The fastening digits 13 essentially extend axially, with the fastening digits 13 expanding in the default position opposite the direction of assembly E up to a stop section 14 at the end, which shows a smaller opening cross-section compared to the opening cross-section limited by the fastening digits 13.

The annular latching element 12 additionally comprises an annular groove 15, engaged in the default position by the fastening ring 16 of the drive element 11 projecting inwardly. The fastening ring 16 of the drive element 11 extends in a central area inside thereof. For a detachable connection of the latching sheath 10 and the drive element 11 the latching sheath 10 is inserted in the direction of assembly E into the bore of the drive element 11 until the fastening ring 16 of the drive element 11 latches in the annular groove 15 of the annular latching element 12 so that a latching connection is given in the default position of the latching sheath 10 and the drive element 11 reached at this point.

In the radial direction the annular latch element 12 comprises an internal profile 17 at the inside, which in the assembled position engages an external profiling 18 provided at the rear end 9 of the adjustment screw 3. The rear end 9 of the adjustment screw 3 is therefore connected in the assembled position in the radial direction by a form-fitting connection to the latching sheath 10.

In order to allow for the latching sheath 11 to be connected to the drive element 11 in a torque-proof fashion the latching sheath 10 comprises a number of radially projecting entraining bars 19, which during the relative displacement of the latching sheath 10 engage corresponding recesses 20 of the drive element 11.

In order to move the adjustment screw 3 into an axially and torque-proof connection to the assembly formed by the latching sheath 10 and the drive element 11 the adjustment screw 3 is inserted in the direction of assembly E into the space of the latching sheath 10 limited by the fastening digits 13, the latching sheath 10 is entrained in the direction of assembly E until the assembly position is reached, at which the annular latch element 12 engages behind a partial annular area 21 of the drive element 11 at its end. The annular latch element 12 comprises barbed sections 22 arranged distributed over the perimeter, with drive elements 11 of the partial annular area 21 arranged at the end engaging them. The annular latch element 12 and the partial annular area 21 of the drive element 11 form here latching means for the axial locking of the latching sheath 10 and/or the adjustment screw 3 in the drive element 11. An axial displacement opposite the direction of assembly E is thereby prevented.

The stop section 14 arranged at the opposite end of the latching sheath 10 contributes to preventing the slippage of the latching sheath 10 in the direction of installation E of the drive element 11. Such an undesired slippage is however already prevented by the bulging shape of the latching sheath 10 and/or the drive element 11.

In the assembly position the latching sheath 10 is connected to the drive element 11 in the radial direction in a form-fitting fashion. The elastic fastening digits 13 press against the internal area 23 of the drive element 11 outwardly in the radial direction. A fastening collar 24 of the adjustment screw 3 is grasped at the outside by ends of fastening digits 13 pointing radially inwardly.

The distance of a free end 9' of the adjustment screw 3 from the limiting collar 6 is selected such that the O-ring 7 is compressed in the assembled position in the axial direction and thus causes a tight contact of the adjustment screw 3 to the housing wall 2'.

When the parts of the adjustment device 1 are in the position of assembly, the rear end 9, the latching sheath 10, and the drive element 11 are connected to each other in a torque-proof and axially fixed fashion (non-detachable connection).

The drive element 11 comprises at the perimeter a miter gear 25, which can engage another miter gear 26 oriented perpendicular in reference to the adjustment screw 3 so that via auxiliary tools the adjustment screw 3 can be rotated about its axis A.

The latching sheath 10 and the drive element 11 are preferably made from the same material, preferably a plastic composite.

According to an alternative embodiment, not shown, the partial annular area 21 of the drive element 11 may also be embodied as an annular area, continuous in the circumferential direction. The latching element 12 may also be embodied as a section of a ring or a continuous ring.

LIST OF REFERENCE CHARACTERS

1 Adjustment device
2, 2' Light module/housing wall
3 Adjustment screw
4 Thread
5 Front end
6 Limiting collar
7 Sealing ring/O-ring
8 Bore
9, 9' Rear end/free end
10 Latching sheath
11 Drive means
12 Latch element 13 Fastening digit
14 Stop section
15 Annular groove
16 Fastening ring
17 Internal profiling
18 External profiling
19 Entraining bars
20 Recesses
21 Partial annular area
22 Barbed section
23 Internal area
24 Fastening collar
25 Miter gear
26 Miter gear
E Direction of assembly
A Axis

The invention claimed is:

1. An adjustment device for headlights comprising:
   an adjustment screw extending in a predetermined direction of adjustment of a light module of a headlight having a thread, said adjustment screw engaging with the thread for pivoting the light module about a horizontal or vertical axis;
   a drive means arranged coaxially in reference with the adjustment screw at a rear end of said adjustment screw;
   wherein a latching sheath and a drive element surrounding the latching sheath are provided as drive means, receiving the rear end of the adjustment screw, with the latching sheath comprising fastening digits elastic in the radial direction, which in the assembled position press against the interior of the drive element and with the latching sheath and the drive element being non-rotatably coupled to each other via latching means in the axial direction and in a latching fashion.

2. The adjustment device according to claim 1, wherein the latching sheath comprises an at least partially annular latching element as a latching means, which engages behind an at least partial annular area at the end of the drive element for the axial securing of at least one of the latching sheath and the adjusting screw.

3. The adjustment device according to claim 1, wherein the latching sheath is connected in a torque-proof fashion to the drive element, which cooperates with an entraining bar projecting radially outwardly and cooperating with a recess of the drive element.

4. The adjustment device according to claim 1 wherein the rear end of the adjustment screw is connected in the radial direction to the latching sheath in a form-fitting fashion.

5. The adjustment device according to claim 1 wherein the latching sheath is connected in the radial direction to the drive element in a form-fitting fashion.

6. The adjustment device according to claim 1 wherein an at least partially annular latching element shows an internal profiling which in the assembled position engages an external profiling of the adjustment screw.

7. The adjustment device according to claim 1 wherein the at least partially annular latching element of the latching sheath comprises at the exterior an annular groove, which in the initial position engages a fastening ring of the drive element, projecting radially inwardly from its central area.

8. The adjustment device according to claim 1 wherein the adjustment screw comprises a limiting collar, which in the assembled position axially presses upon an O-ring supported at the housing wall of the light module.

9. The adjustment device according to claim 1 wherein the drive element comprises a miter gear for coupling with another miter gear oriented perpendicular in reference to the adjustment screw.

10. The adjustment device according to claim 1 wherein the adjustment screw comprises a fastening collar, with the fastening digits of the latching sheath being supported thereon at the inside in the assembled position.

* * * * *